Oct. 2, 1962     H. EPSTEIN     3,056,289
METHOD AND APPARATUS FOR PREPARING AND TESTING SAMPLE SKEINS
Filed Dec. 17, 1959     3 Sheets-Sheet 1

INVENTOR.
HERMAN EPSTEIN
BY
ATTORNEY

Oct. 2, 1962 H. EPSTEIN 3,056,289
METHOD AND APPARATUS FOR PREPARING AND TESTING SAMPLE SKEINS
Filed Dec. 17, 1959 3 Sheets-Sheet 2

INVENTOR.
HERMAN EPSTEIN
BY
ATTORNEY

INVENTOR.
HERMAN EPSTEIN
BY Theod. Hoepner
ATTORNEY

3,056,289
METHOD AND APPARATUS FOR PREPARING AND TESTING SAMPLE SKEINS
Herman Epstein, 548 S. 11th St., Newark, N.J.
Filed Dec. 17, 1959, Ser. No. 860,128
12 Claims. (Cl. 73—160)

This invention relates to methods and apparatus for preparing and testing sample skeins of natural and synthetic fibers, and more specifically to mass production procedures and the means required therefor.

It is usual in the preparation and testing of sample skeins to wind a few (five to ten) skeins onto a hand reel, and take the skeins off the reel individually and place them into a heater for bulking and later testing and grading in accordance with their percentage of bulk and lineal dimensions. In this procedure each of the skeins is numbered with a numbered tag which usually forms part of the standard weight used in bulking, and assigned to similar bulk classified lots.

However, if the production runs large, this procedure was found to be very expensive.

One of the objects of the invention is to prepare and test the sample skeins on a mass production basis.

A more specific object of the invention is to wind the yarn from a predetermined number of packages or rolls which are positioned horizontally and vertically onto a movable creel or truck and designated by different numbers and/or colors and to unwind the yarn from these different creel rolls onto a common substantially planar reel on which the different skeins are arranged spaced from each other and in a substantially parallel array, in predetermined numbered positions, each skein to coincide numerically and consecutively with the numbered roll arranged on the creel.

Another object of the invention is to provide a reel of substantially planar structure open at one end and supporting the skeins derived from the different packages on a removable bar which is notched along its length to receive each skein in a separately spaced position, and opposite to which the standard weights are attached to each skein, with all the skeins separated from each other by spaced notches.

A further object of the invention is to make a space-notched supporting bar removable from the reel, which may be loosened and displaced as one unit with the skeins hanging vertically in the spaced notches.

Still another object of the invention is to transport the space-notches supporting bar with the skeins supported thereon in vertical positions separated from each other and predeterminedly weighted, into an oven and subject it to a predetermined time and temperature cycle after which the unit is removed from the oven and arranged vertically adjacent to a prenumbered chart for grading each skein for its linear dimensions and bulking quality.

These and other objects of the invention will be more fully apparent from the drawings attached herewith in which FIGS. 1 and 2 represent a creel and a reel in operative positions, in front and top views, respectively, and embodying certain features of the invention.

FIGS. 3 and 4 represent another view of creel and reel shown in FIGS. 1 and 2 respectively, in operative positions corresponding to those shown in FIGS. 1 and 2, respectively.

Figure 1:
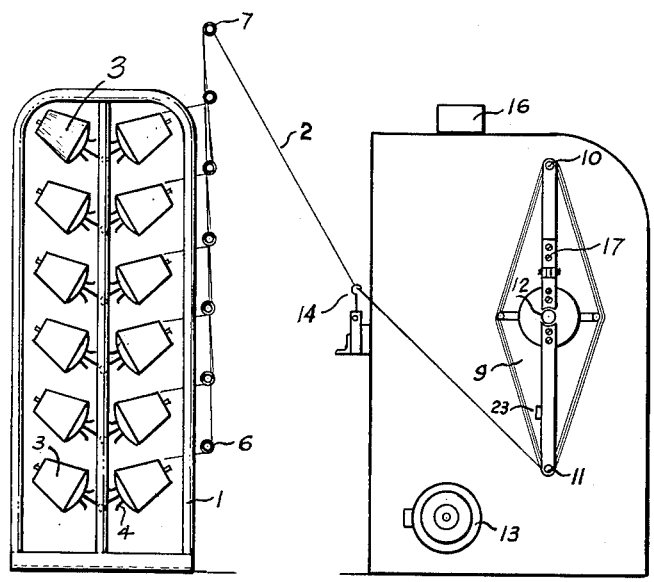
Figure 3:
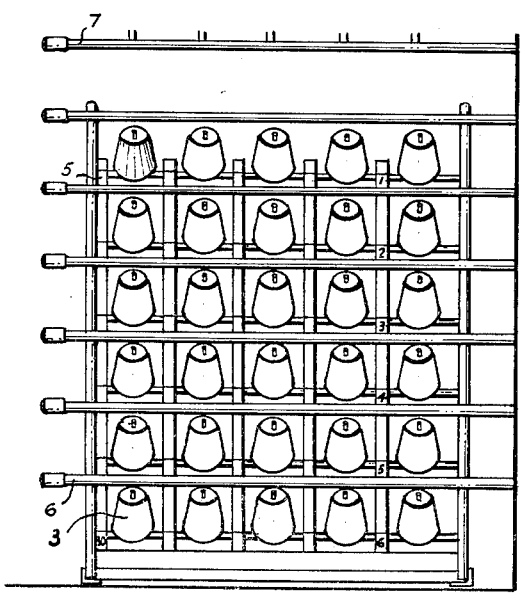

FIGS. 1 and 3 show the half side of a creel or truck 1 which receives the yarn 2 after it has been crimped. Yarn 2 is unwound from wound packages not shown, and wound into cones or rolls 3 supported on holders 4 positioned in five vertical and six horizontal rows designated and identified by four groups of thirty different numbers. For example, numbers 1 to 30 in one color are arranged on one half side of creel 1; numbers 31 to 60 of another color on the other half side of creel 1; numbers 61 to 90 in a third color on the back of one half side of creel 1 and numbers 91 to 120 in a fourth color on the back of the other half side of creel 1. In this way, a total of 120 packages of skeins will be identified by numbers distributed over four colors and will be coordinated with corresponding cone holders 4.

Each cone holder 4 has arranged nearby a number 5 and the numbers run vertically from top to the bottom, and from right to left consecutively.

Creel 1 is positioned adjacent to and facing a series of horizontal tension bars 6, one for each horizontal row of rolls 3 on creel 1. Tension bars 6 are arranged to match each horizontal row of five rolls 3 of yarn. The yarn runs first under individual tension bar 6 and then up to and over master tension bar 7, and from there it runs to reel 9. This serves to maintain the yarn while unwinding from each roll 3 onto reel 9 at relatively the same tension.

Figure 4:
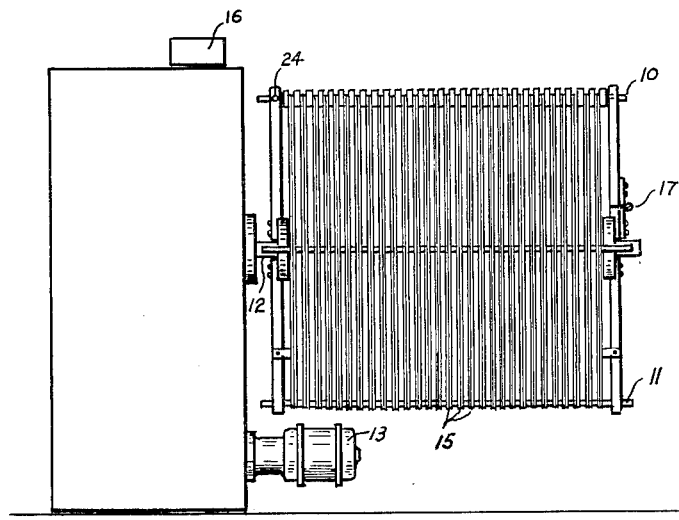
Figure 2:
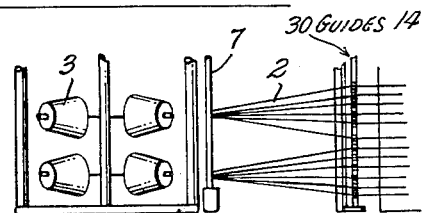

As apparent from FIGS. 2 and 4, reel 9 is of substantially planar structure and consists of two horizontal bars 10, 11, arranged diametrically with respect to and in the same plane with rotating shaft 12 for reel 9. Shaft 12 is driven by an electrical motor schematically indicated at 13 and during its rotation the skeins derived from rolls 3 are guided onto reel 9 by means of a yarn guide 14 and wound in parallel positions over the bar 10 and 11, forming a number of elongated coils 15, under control of a very slow transverse cross movement applied to guiding bar 14.

Reel 9 is further provided with a presettable counting mechanism indicated at 16, and one of the coil supporting bars, 10, is provided with a number of predetermined spaced notches to receive each skein separately in a predeterminedly spaced position in which each skein will coincide numerically and in the right consecutive order with the correspondingly numbered roll on creel 1.

Figure 5:
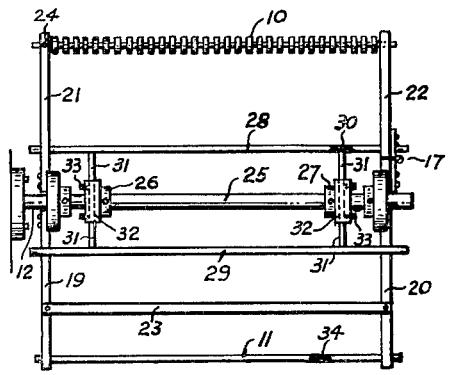
FIG. 5 shows a reel ready for winding of the skeins and testing.
Figure 6:
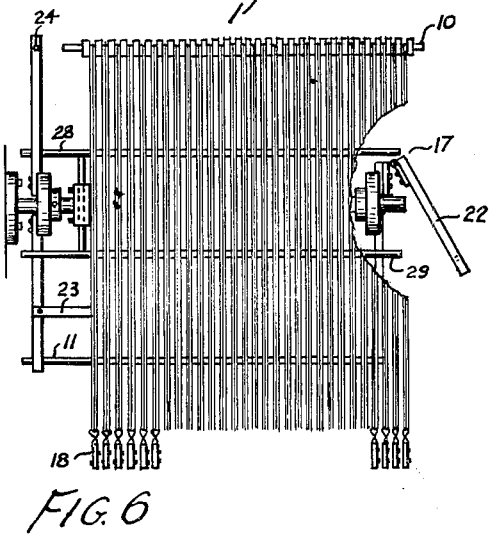
FIG. 6 shows the reel ready for removal of the skeins.

Notched bar 10 is also hingedly supported at 17 as to permit it to be removed with the skeins supported thereon in predeterminedly numbered positions, identified with the number 5 of rolls 3 on creel 1 as is more clearly apparent from FIGS. 5 and 6.

For this purpose notched bar 10, as well as diametrical bar 11, are supported each on pairs of brackets 19, 20 and 21, 22 respectively.

Bracket 21 is provided with an L-shaped slot (not shown) 23 in which bar 10 is held fixed by means of a screw 24. When screw 24 is unscrewed, notched bar 10 can be removed by means of rotating bracket 22 of hinge 17 as indicated on FIG. 6. Shaft 12 of reel 9 extends into a bar 25, and attached thereto are two sliding members 26 and 27 supporting bars 28 and 29, by means of bolts 31 fitting at one end into longitudinal slots of bars 28, 29, schematically indicated at 30, and at the other end in bores 32 of sliding members 26, 27. The radial distance of side bars 28, 29 and thereby the length of the skeins can be adjusted by extending bolts 31 more or less into bores 32 and fixing their radial position by means of screws schematically indicated in FIG. 5 at 33.

Bar 11 is provided with a longitudinal groove schematically indicated at 34 so that clips with standard 14 gram weights 18 attached thereto can be easily fastened to the skeins before the notched bar 10 is removed so that they hang vertically while being removed as a unit together with bar 10.

Figure 7:
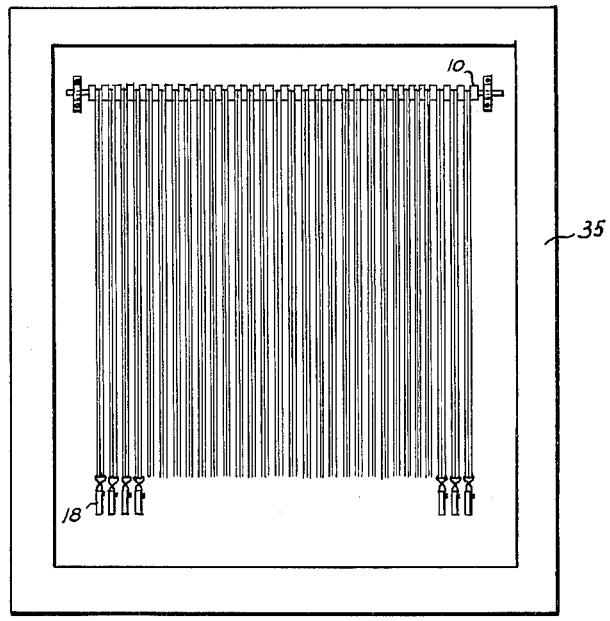
FIG. 7 shows the skein removed and hung into an oven.

The notched bar 10, together with the skeins supported thereon, is then suspended vertically in an oven schematically indicated at 35, FIG. 7, and subjected to a predetermined time and temperature cycle, in accordance with the test procedure desired.

Figure 8:
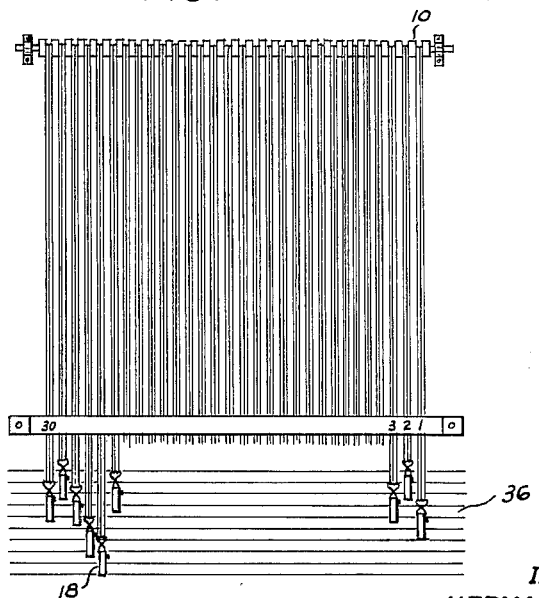
FIG. 8 shows the skeins after having been processed, assembled with a test chart.

Therefore, bar 10, together with its skeins is removed and as apparent from FIG. 8, it is suspended vertically parallel and adjacent to a planar chart 36. Chart 36 is numbered at appropriate portions thereof substantially coinciding with the corresponding positions of the skeins depending from bar 10 and it also provides at these portions dimensional percentage graduations to permit each skein to be identified and graded for its linear dimensions and bulking qualities. This in turn permits to categorize each skein and to facilitate further processing of the skeins, even knitting and weaving by combining each skein with bulk of similar properties.

It is apparent that if the skeins are suspended over chart 36 in a fixed position, each skein will have a number coinciding with the position and number of rolls 3 on creel 1.

The invention is not limited to the method steps and apparatus shown and described, but may be applied in any manner whatsoever with any manner of yarn packages, rolls, or cones, with any types of yarns, with any arrangement of creel, reel and spacing bars, and with any test procedure required and all this without departing from the scope of this disclosure.

I claim:

1. In a method for preparing and testing sample skeins, the steps of arranging a number of different yarn packages in a corresponding number of spirally wound rolls of substantially rotary shape at predetermined positions in perpendicular arrays, unwinding the yarn from said rolls and onto a single planar array of corresponding number of substantially juxtaposed linearly shaped coils spaced from each other, arranging said planar array in a substantially vertical plane, and subjecting each element of said planar array individually to a predetermined stretching procedure to determine its structural characteristics in a manner identifying each of said linear coils with each of said packages.

2. Method according to claim 1, wherein said planar array after having been subjected to testing is arranged parallel to a testing chart having positions numbered and graded to permit identification of each coil as well as indication of the result of testing.

3. Method according to claim 1, wherein said planar array extends into a vertical plane, each coil being supported at the top end and being predeterminedly weighted at the bottom end; said planar array after having been subjected to predetermined heating being arranged parallel adjacent to a test chart permitting identification as well as evaluation of the result of said heating for said different coils in their different positions.

4. In an apparatus for the preparation and testing of sample skeins, first means for arranging a number of yarn packages onto predeterminedly numbered positions in the form of substantially rotary shaped spirally wound coils, means for winding the yarns from said positions onto a number of linearly shaped coils forming a substantially single planar array parallel to and spaced from each other and predeterminedly numbered for identification with the corresponding numbers of said predeterminedly numbered positions on said first means, means for arranging said planar arrays in a substantially vertical plane, and means for predeterminedly weighting each of said linear coils at the lower ends thereof to determine its structural characteristics in a manner identifying each of said linear coils with each of said yarn packages.

5. Apparatus according to claim 4, wherein said coils are supported as a single removable unit.

6. Apparatus according to claim 4, wherein said coils are supported at one end on a horizontal bar provided with recesses to receive said coils in predeterminedly spaced positions.

7. Apparatus according to claim 4, wherein said winding means include means removable therefrom for supporting said coils at one end thereof.

8. Apparatus according to claim 4, wherein said winding means include a horizontal shaft and a pair of bars arranged parallel to, spaced from and rotatable with said shaft to support said coils at opposite ends thereof in predetermined spaced positions, one of said bars being removable from said winding means together with said coils.

9. Apparatus according to claim 8, wherein said removable bar is supported on a bracket which is hinged so as to permit removal of said bar from said winding means with its coils supported thereon in substantially vertical positions.

10. Apparatus according to claim 4, wherein said removable bar is provided with recesses along its length to receive said coils in spaced positions.

11. Apparatus according to claim 4, wherein said first means includes a number of cones arranged in several vertical as well as horizontal rows.

12. Apparatus according to claim 4, wherein said winding means includes a reel of substantially planar extension open at one end thereof and rotatable about a horizontal axis extending within said plane.

References Cited in the file of this patent

UNITED STATES PATENTS

| | | |
|---|---|---|
| 1,519,804 | Sieber | Dec. 16, 1924 |
| 1,678,975 | Cocker | July 31, 1928 |
| 1,793,980 | Weinstein | Feb. 24, 1931 |
| 2,153,810 | Mercer | Apr. 11, 1936 |
| 2,240,505 | Lessig | May 6, 1941 |
| 2,432,270 | Asbill | Dec. 9, 1947 |

FOREIGN PATENTS

| | | |
|---|---|---|
| 140,372 | Germany | Feb. 12, 1902 |